United States Patent [19]

Taylor

[11] Patent Number: 5,727,586
[45] Date of Patent: Mar. 17, 1998

[54] RECLOSING COLLAPSIBLE PIN PRESSURE RELIEF VALVE

[76] Inventor: Julian S. Taylor, 8300 SW. 8th, Oklahoma City, Okla. 73128

[21] Appl. No.: 766,706

[22] Filed: Dec. 13, 1996

[51] Int. Cl.⁶ .................................................. F16K 17/14
[52] U.S. Cl. ................................... 137/68.11; 137/70
[58] Field of Search ................................. 137/68.11, 70

[56] References Cited

U.S. PATENT DOCUMENTS 5,273,065 12/1993 Taylor ........................................ 137/70
5,577,524 11/1996 Taylor ........................................ 137/70

*Primary Examiner*—John Fox
*Attorney, Agent, or Firm*—Robert K. Rhea

[57] ABSTRACT

A fluid pressure relief valve of the excess pressure collapsible pin relief valve type which monitors fluid pressure in a system and automatically recloses after opening and discharging an initial volume of high pressure fluid. The relief valve includes a valve body connected with a fluid system being monitored with a valve head closing an inlet port and having a valve stem projecting axially beyond the valve head through the valve body and maintained closed by a pin cage having a collapsible pin axially abutting the outward end of the valve stem. A cylinder surrounds the valve stem between the valve body and the pin cage with a piston connected with the valve stem at the cylinder end opposite the valve head. A proximity switch responsive to outward movement of the valve stem upon collapse of the pin energizes a circuit opening a valve connecting a source of pressurized gas with the piston end of the cylinder to force the valve head toward end of the seat and close the relief valve.

5 Claims, 4 Drawing Sheets

“5,727,586”

RECLOSING COLLAPSIBLE PIN PRESSURE RELIEF VALVE

This invention relates to pressure relief valve and more particularly to a collapsible pin type valve which immediately recloses following a pressure release opening thereof.

BACKGROUND OF THE INVENTION

Heretofore prior pressure relief valves of the frangible pin, frangible disk, or collapsible pin type have required that they be individually manually reset by removing at least some of the components for installing a replaceable or new pressure responsive element while the fluid system monitored by the opened relief valve remains in a shut-down condition before the system can be returned to operation.

This invention provides a collapsible pin relief valve which monitors fluid pressure in a system and automatically recloses after opening and discharging an initial volume of high pressure fluid, thus permitting the system to be maintained in operation and the replacement of the collapsible pin without a shut-down of the system monitored by the relief valve.

SUMMARY OF THE INVENTION

A valve body having a central bore forming an inlet port at one end is provided with a lateral bore intermediate the ends of the central bore. A centrally apertured cap closes the end of the bore opposite the inlet port and is held in place by a cylinder interposed between a centrally bored cylinder plate axially opposite the valve body cap and anchored to the valve body by a plurality of bolts.

A piston-like valve normally closes the inlet port and is provided with an elongated valve stem projecting axially through and beyond the cylinder. The valve stem axially supports a piston within the cylinder.

Valve cage means axially surrounds the end of the valve stem projecting beyond the cylinder plate. The valve stem means comprises a plurality of posts axially anchoring a top plate to the cylinder plate. A pressure responsive collapsible pin axially interposed between the outwardly projecting end of the piston rod and the top plate normally maintains the relief valve closed. The valve cap and the cylinder plate are each provided with lateral bores communicating with respective ends of the cylinder on opposite sides of a cylinder piston. A proximity switch senses the presence of the valve stem in response to the valve opening and energizes a time delay unit connected with the solenoid of a three-way valve which opens and applies gas pressure to move the piston and close the relief valve, allowing the fluid system to continue operation while personnel replaces the collapsed pin.

The principal object of this invention is to provide a fluid pressure relief valve for a fluid system which is biased open in response to a predetermined pressure value in the system and releases a quantity of fluid pressure for a given period of time and automatically closes to contain the fluid pressure in the system and which permits replacement of the collapsed pin to return the relief valve to fluid pressure monitoring position without further interruption of the fluid system operation.

DESCRIPTION OF THE PREFERRED EMBODIMENT

Figure 1:
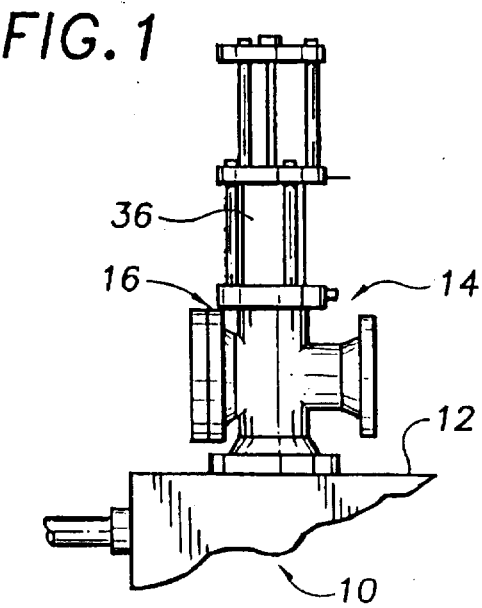
FIG. 1 is a fragmentary side elevational view illustrating the relative position of the valve on a container of a fluid system being monitored.
Figure 4:
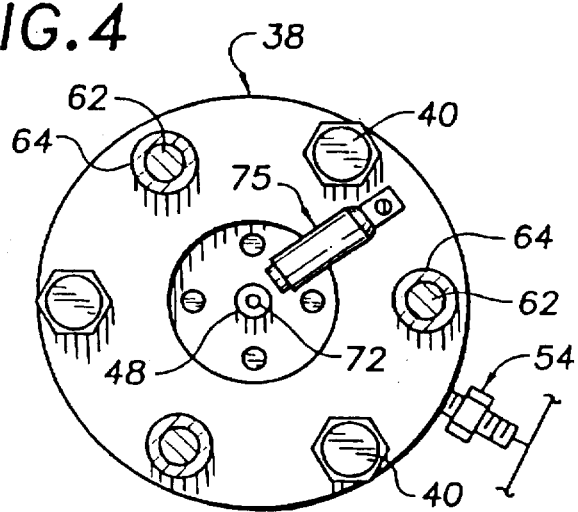
FIGS. 3 & 4 are horizontal cross-sectional views taken substantially along the lines 3—3 and 4—4, respectively of FIG. 2.
Figure 3:
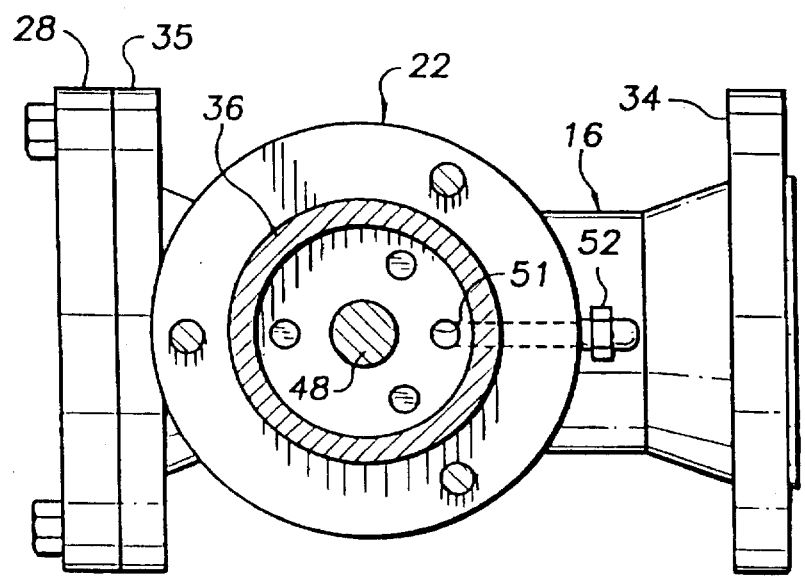
Figure 2:
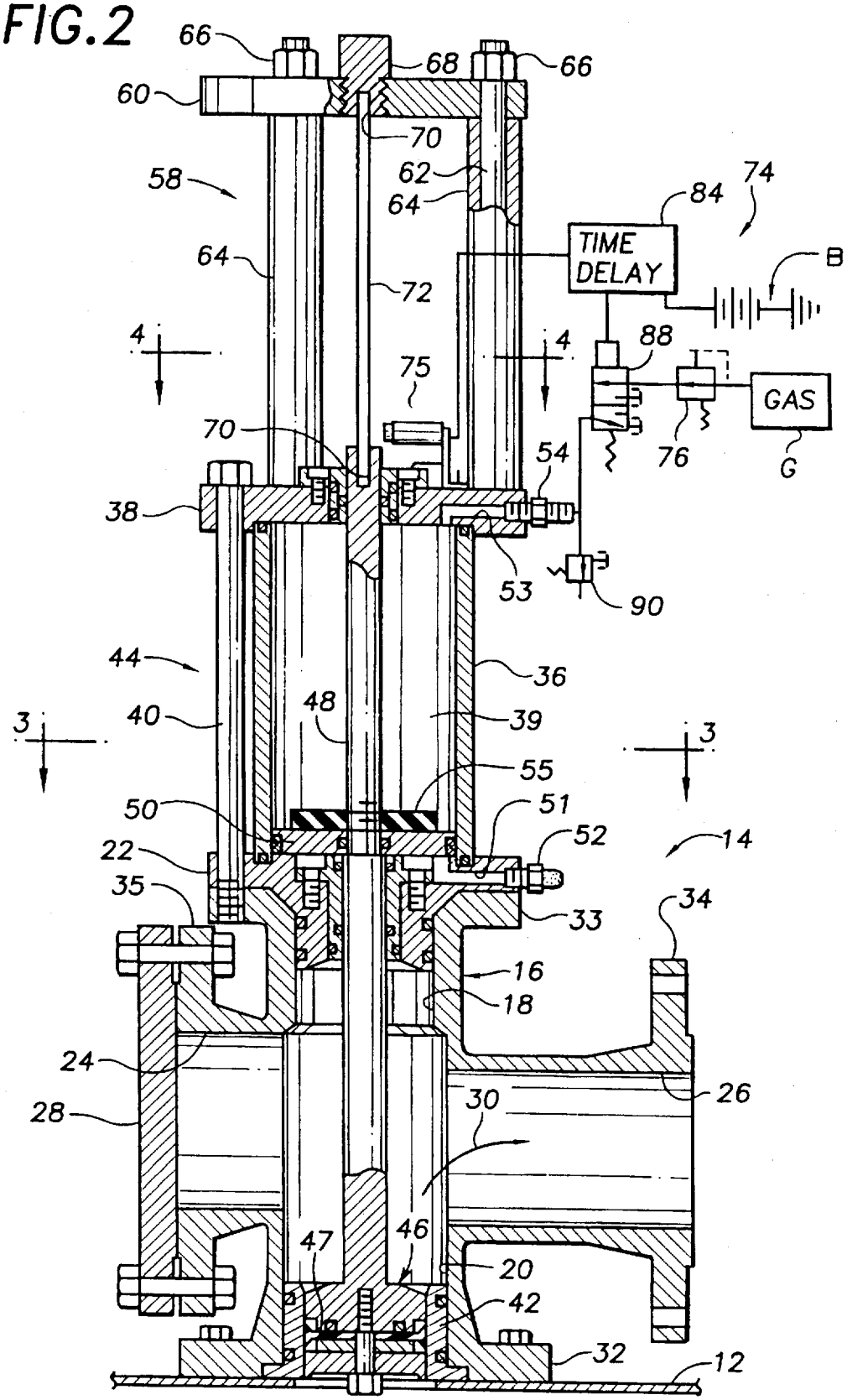
FIG. 2 is a vertical cross-section view, to a larger scale, and diagram of the valve in operative position.

Like characters of reference designate like parts in those figures of the drawings in which they occur.

In the drawings:

The reference numeral 10 indicates a fluid pressure system including a container 12 having a normally closed relief valve 14 mounted thereon for opening and releasing fluid pressure from the container 12 when the pressure reaches a predetermined value.

The valve 14 comprises a valve body 16 having an axial bore 18 forming an inlet port 20 connected with the container 12. The other end of the bore 18 is closed by a centrally bored valve cap 22. The valve body 16 is provided with a lateral bore 24 normal to the axis of the longitudinal bore 18 for forming an outlet port 26 and fluid passageway 30. The end of the lateral bore 24 opposite the outlet port is closed by valve plate 28. The valve body 16 includes bolt flanges 32—33 and 34—35 surrounding the end portions of the bores 18 and 24, respectively.

The valve cap 22 is maintained in place by a cylinder 36 axially aligned with the bore 18 and a centrally bored cylinder plate 38 overlying the outward end of the cylinder 36. A plurality (3) of bolts 40, extending through the peripheral margin of the cylinder plate 38 and valve cap 22, are threadedly connected with the valve body flange 33 to impinge the cylinder 36 between the cylinder cap 38 and the valve cap 22 forming a cylinder chamber 39.

Figure 5:
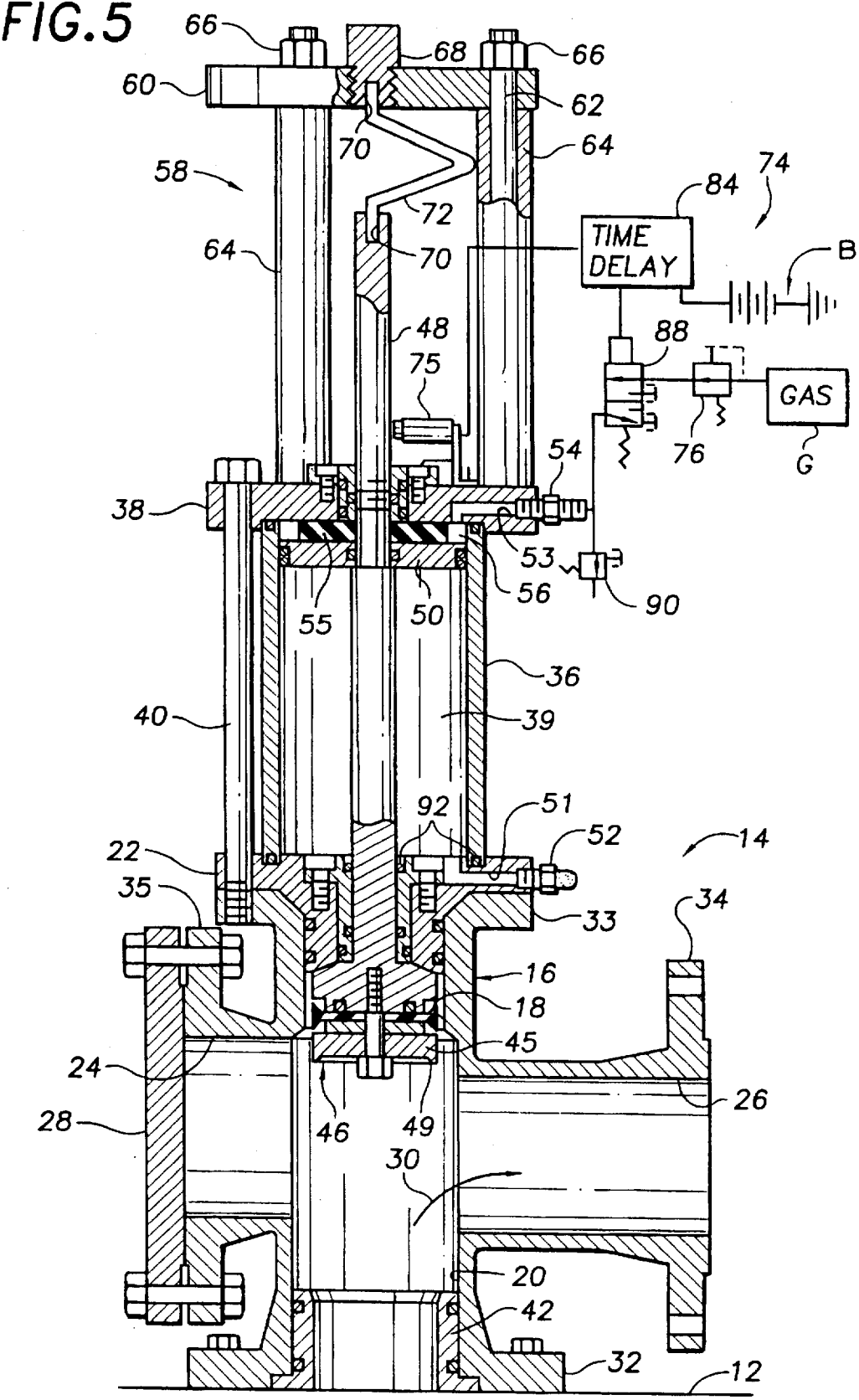
FIG. 5 is a view similar to FIG. 2 with the valve in open position.

The inlet port 20 is step diameter counterbored for receiving a valve seat 42. Valve and piston means 44 opens the inlet port 20. The valve and piston means comprises a valve head 46 having an annular seal 47, normally slidably sealing with the valve seat 42 and a valve stem 48 slidably projecting through the central bores of the valve cap 22 and the cylinder plate 38. The depending end of the valve head 46 is characterized by a disk portion 45 having a sharp peripheral knife-like edge 49 (FIG. 5) for severing any material that may tend to interfere with the seal 47 contacting the valve seat 42. A piston 50 is threadedly connected with the rod 48 within the cylinder 36.

The valve cap 22 is provided with a lateral port 51 communicating at its inward end with the piston chamber 39 and closed by a vent plug 52 threadedly connected with its outer threaded end for exhausting air from the piston chamber 39 when the piston moves toward the valve cap 22, as presently explained. Similarly the piston plate 38 is provided with a lateral port 53 having its inward end portion communicating with the piston chamber 39 at the end of the piston 50 opposite the valve cap 22 and threadedly receiving a fitting 54 in its outward end portion. A spacer 55 or bumper surrounds the valve stem 48 and secures the piston 50 to the valve stem 48 and defines an annular space 56 (FIG. 5) communicating with the inward end portion of the cylinder plate lateral bore 53.

Pin and cage means 58 axially surrounds the outwardly projecting end of the valve stem 48. The pin cage means 58 comprises a pin plate 60 maintained in parallel spaced relation with respect to the cylinder end plate 38 by a plurality (3) of posts 62 projecting through cooperating bores in the pin plate 60 and threadedly engaging threaded bores in the cylinder plate 38 in radial and circumferential equally spaced relation. A like plurality of sleeves 64 respectively surround the posts 62. A post nut 66 threadedly connected to the end of the respective post opposite the piston plate 38 impinges the sleeves 64 between the cylinder plate 38 and pin plate 60. The pin plate 60 is centrally bored and threaded for receiving the threaded end portion of a step diameter pin supporting nut 68. The confronting ends of the pin supporting nut 68 and the valve stem 48 are coaxially drilled to form sockets 70 respectively receiving the end portions of a collapsible pin 72 which normally maintains the valve 46 sealed with the valve seat 42.

Valve control means 74 includes a proximity switch 75 sensing the position of the valve stem 48 when the relief valve opens and triggers operation of the control means 74 to close the relief valve. The proximity switch 75 is mounted on the cylinder plate 38 and projects toward the axis of the valve stem 48 beyond the outwardly disposed end of the valve stem when the valve 46 is seated with the valve seat 42. When the valve and piston means 44 is biased to an open position, as presently explained, the adjacent surface of the extended end portion of the valve stem 48 energizes the proximity switch 75 to start a time delay sequence by a time delay 84 energized by a direct current source, such as a battery B. A source of compressed gas G is connected with the fitting 54 through a pressure regulator 86 and a three-way two-position normally closed solenoid opened and spring return valve 88. An emergency relief valve 90 set to open at a predetermined value of the set point of the relief valve 14 is connected with the fitting 54 and valve 88 in downstream relation. Conventional O'rings 92 preclude fluid leakage between the several cooperating components of the relief valve 14.

Operation

Figure 6:
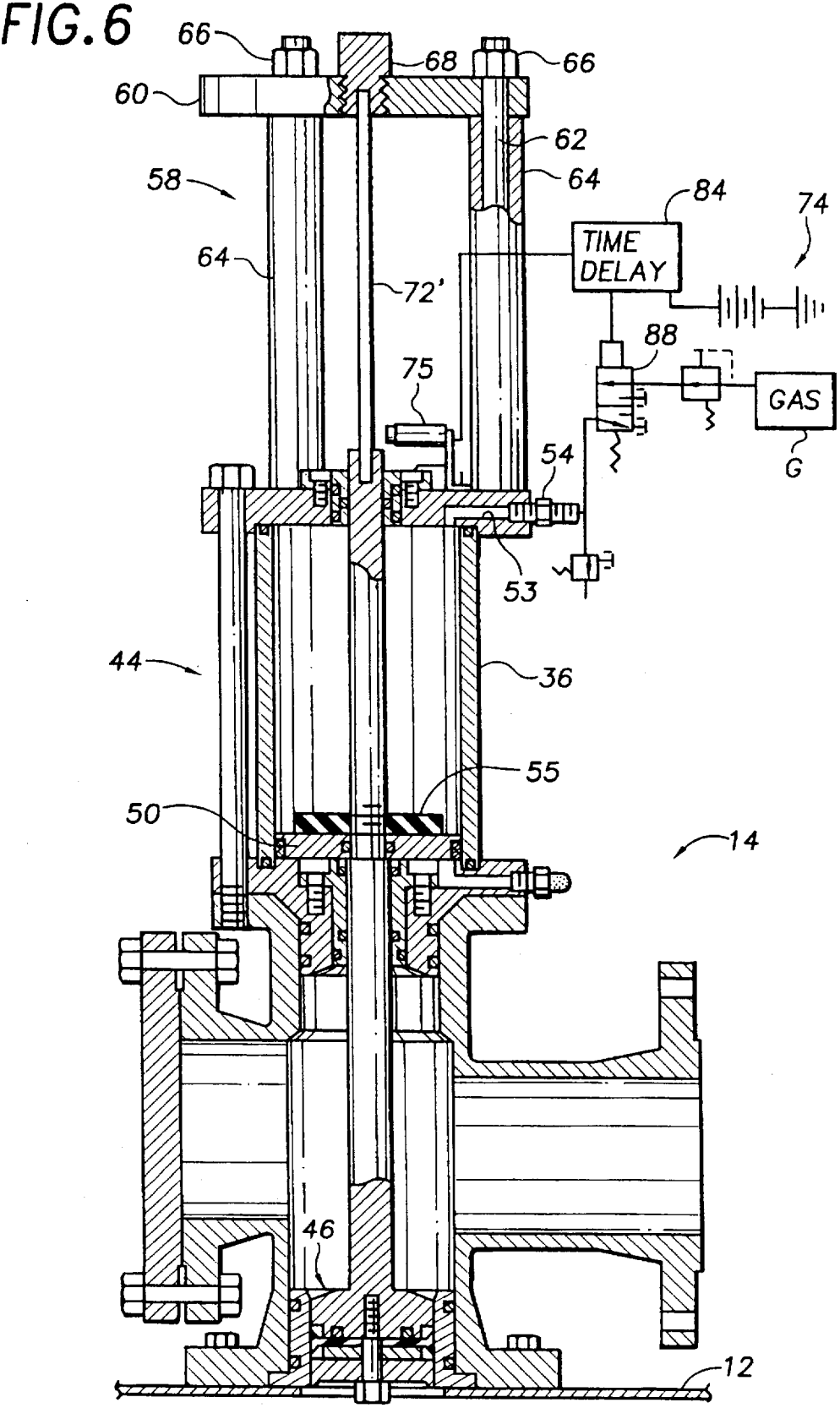
FIG. 6 is a vertical cross-sectional view, similar to FIG. 2, illustrating the valve in reclosed position and the collapsed pin replaced.

Assuming the valve 14 constructed as described herein above is mounted on the container 12 and the collapsible pin 72 has a value or collapsible set point for yielding or collapsing at a predetermined value of fluid pressure at the inlet port 20 to bias the valve 14 open. In response to opening movement of the valve and piston means 44 the outwardly projecting end portion of the valve stem 48 adjacent the proximity switch 75 energizes the latter to trigger the time delay 84 which, after a predetermined time interval, energizes the solenoid of the valve 88 to apply gas pressure to the piston annulus 56 and force the valve 46 and piston 50 toward the inlet port 20 to seal the valve 46 with the seat 42 and interrupt fluid flow through the passageway 30. The setting of the pressure regulator 76, downstream from the gas supply G, is such that pressure applied to the piston 50 is just sufficient to hold the valve 46 closed at normal system operating pressure. In addition a signal from proximity switch 75 alerts operation or maintenance personnel that the valve 14 has opened. The maintenance personnel resets the valve 14 by removing the plug 68 and the collapsed pin 72 and inserts a new replacement pin 72', as illustrated by FIG. 6, thus completing one cycle of operation.

Obviously the invention is susceptible to changes or alterations without defeating its practicability. Therefore, I do not wish to be confined to the preferred embodiment shown in the drawings and described herein.

I claim:

1. In a fluid pressure relief valve including a valve body having and axial inlet port and a lateral outlet port, a valve head normally closing the inlet port, a valve stem axially projecting beyond the body, and pin cage means for axially surrounding the valve stem including an axial pressure responsive collapsible pin normally maintaining the relief valve closed, the improvement comprising:

a closed end cylinder interposed between said body and the pin cage means around said valve stem for forming a piston chamber;

piston means secured to and moveable with said valve stem within the piston chamber;

a source of gas under a predetermined pressure;

conduit means including a normally closed three-way solenoid valve connecting the source of gas with the piston chamber opposite the inlet port; and, circuit means including a proximity switch and time delay unit connected with said three-way valve, whereby said proximity switch sensing the presence of said valve stem by the opening of the relief valve energizes the time delay to open said three-way valve and force the piston means and valve head to a relief valve closed position.

2. In a fluid pressure relief valve including a valve body having an axial inlet port and a lateral outlet port, a valve head normally closing the inlet port, a valve stem projecting axially beyond the body, and pin cage means axially surrounding and projecting downstream beyond the valve stem including an axial pressure responsive collapsible pin normally maintaining the relief valve inlet port closed, the improvement comprising:

cylinder means interposed between said body and the pin cage means including piston means secured to and moveable with the valve stem within the cylinder;

a source of pressurized gas;

other normally closed valve means connecting the source of gas with the cylinder end opposite the inlet port; and, circuit means including a proximity switch responsive to the presence of said valve stem by the opening of the relief valve for opening said other valve means and closing said relief valve.

3. The relief valve according to claim 2 in which said cylinder means includes:

a cylinder plate interposed between the cylinder means and the pin cage means for closing the cylinder means opposite the body and supporting the pin cage means.

4. The relief valve according to claim 2 in which said circuit means further includes;

time delay means interposed between said proximity switch and said other valve means.

5. In a fluid pressure relief valve including a valve body having an axial cylindrical wall inlet port and a lateral outlet port, a valve normally closing the inlet port including a valve stem axially projecting beyond the body and having a pin cage means axially projecting beyond the body and valve stem opposite the inlet port and normally maintaining the relief valve closed, the improvement comprising:

a disk on said valve opposite the valve stem, said disk having a knife-like peripheral edge contiguously contacting the inlet port wall;

a closed end cylinder interposed between said body and the pin cage means around said valve stem for forming a piston chamber;

piston means secured to and moveable with said valve stem within the piston chamber;

a source of gas under a predetermined pressure;

conduit means including a normally closed three-way solenoid valve connecting the source of gas with the piston chamber opposite the inlet port; and, circuit means including a proximity switch and time delay unit connected with said three-way valve, whereby said proximity switch sensing the presence of said valve stem by the opening of the relief valve energizes the time delay to open said three-way valve and force the piston means and valve head to a relief valve closed position.

* * * * *